United States Patent
Bowden, Sr.

(10) Patent No.: US 9,019,806 B1
(45) Date of Patent: Apr. 28, 2015

(54) LOW FRICTION LINEAR TRACKING TONE ARM

(71) Applicant: Thomas Lloyd Bowden, Sr., Richmond, VA (US)

(72) Inventor: Thomas Lloyd Bowden, Sr., Richmond, VA (US)

( * ) Notice: Subject to any disclaimer, the term of this patent is extended or adjusted under 35 U.S.C. 154(b) by 0 days.

(21) Appl. No.: 14/215,554

(22) Filed: Mar. 17, 2014

(51) Int. Cl.
 G11B 3/00 (2006.01)
 G11B 21/16 (2006.01)

(52) U.S. Cl.
 CPC ........................................ *G11B 3/00* (2013.01)

(58) Field of Classification Search
 None
 See application file for complete search history.

(56) References Cited

U.S. PATENT DOCUMENTS

| | | | | | |
|---|---|---|---|---|---|
| 1,828,171 | A | * | 10/1931 | Buchanan | 369/75.11 |
| 2,350,490 | A | * | 6/1944 | Berliner | 369/223 |
| 2,478,538 | A | * | 8/1949 | Leitner | 369/177 |
| 2,537,214 | A | * | 1/1951 | Di Ghilini et al. | 369/266 |
| 3,622,163 | A | * | 11/1971 | Bachman | 369/220 |
| 3,852,816 | A | * | 12/1974 | Stewart | 360/86 |
| 3,993,315 | A | * | 11/1976 | Hansen et al. | 369/216 |
| 4,322,840 | A | * | 3/1982 | Kusaka | 369/220 |
| 4,346,467 | A | * | 8/1982 | Souther | 369/249.1 |
| 4,470,130 | A | * | 9/1984 | Sakaki et al. | 369/230 |
| 4,535,437 | A | * | 8/1985 | Hiranuma | 369/223 |
| 4,539,672 | A | * | 9/1985 | Einhaus | 369/244.1 |

\* cited by examiner

*Primary Examiner* — Thang Tran (57) ABSTRACT

This invention is provides a means of playing LP records with minimal distortion. Low distortion is achieved by eliminating tracking error normally associated with pickup cartridges mounted to pivoting tone arms. This invention discloses a tone arm that constrains the motion of the stylus to straight radial path, mimicking the cutting path of the record lathe, supported on parallel rails by free rolling spherical bearings. Unlike many previous linear tracking tone arms, this invention does not rely on air pressure or servo motor mechanisms. The use of free rolling bearings or axles between parallel tracks fashioned from rails, rods or tubes, eliminates all sources of lateral friction other than pure static and rolling friction of the balls on the rails, rods or tubes. In the preferred embodiment, the fixed rods or tubes are driven synchronously, thereby eliminating static friction of the supporting rolling balls. Friction is further reduced using magnetic or buoyant support of the tone arm to reduce bearing load to that amount minimally sufficient to maintain full contact between the rolling balls and the upper and lower rods.

6 Claims, 11 Drawing Sheets

LOW FRICTION LINEAR TRACKING TONE ARM

REFERENCE

This application claims the priority of a provisional application filed by the inventor on Mar. 15, 2013, EFS ID 15263793, Application No. 61/793,873, Confirmation number 5988

BACKGROUND

Phonograph records are capable of extremely accurate reproduction of recorded sound, especially music. The theoretically ideal apparatus for replaying sound recorded in the groove of an analog physical medium would be an infinitely long straight groove in which musical information is recorded, played back by a stylus connected to a transducer (cartridge) tracing the path of the groove without lateral or angular deviation or resonance. Since modern phonograph records are typically flat circular media with a groove that spirals toward the center of the records, theoretically ideal playback is challenging. The original Edison phonograph and cylinders in some ways approached this ideal more nearly than modern apparatus, but other limitations of that scheme led to its obsolescence and ultimate demise. Modern devices for playing phonograph records (LPs) typically take one of two approaches; they either utilize a tone arm pivoting on a bearing outside of the radius of the record, or they employ a mechanism that allows the stylus or pickup to move in a lateral direction along a strictly radial path, mimicking the path taken by the cutting head of the recording lathe in the mastering process. Geometrically, non-articulated pivoting tone arms only achieve perfect tangency at two points on the surface of a record. Linear tracking tone arms can theoretically maintain perfect tangency throughout the entire groove.

This invention relates to the second approach. There have been many versions of such so-called linear tracking tone arms. Some use air-bearing technology to virtually eliminate friction in both vertical and horizontal planes. Others-use electronically controlled servo mechanisms to gradually move a tone arm across the surface of the record. Still others have used simple dry linear bearings or linear roller bearings of the type used in linear motion applications in factory automation and numerically controlled milling systems. Each system has its proponents and detractors. While it is generally agreed that an ideal linear tracking tone arm will produce less audible distortion than a pivoting tone arm (not including articulated arms that approximate linear tracking), the means by which the linear tracking tone arm is guided and moved across the record can add distortion and impose operational complications that are not found in a purely passive pivoting tone arm. For example, linear tone arms based on air bearings must have a steady supply of compressed air, and the pump can be a source of direct noise, while the air itself moving through the system can also induce high-frequency noise and artifacts of the pump action. Condensation in the air supply and reservoir systems is also a source of problems. Passive designs based on linear sleeve bearings have been demonstrated, but have relatively high friction in comparison to air bearing systems. Servo controlled systems induce transient tracking errors and noise related to the stepping motions as the servo mechanism continually adjusts the position of the tone arm in relation to the groove. Some of the more critically acclaimed solutions to the linear tracking problem rely on use of miniature roller bearings, which function as wheels rolling in a concave track or on a convex surface made of highly polished glass or a very hard material (e.g. Souther, 4,346, 467, 1980). Axles mounted through the center of the roller bearings are in turn attached to a carriage, which holds the actual tone arm and counterweight. In these systems the very low rolling resistance of the outer rim of the bearings on the concave or convex track approximates zero friction. However, the internal friction of the bearings adds resistance as the bearings rotate around the fixed axles. Typically the bearings used are extremely small and the ratio of the inner track circumference to the outer track circumference is accordingly high. This results in a certain degree of internal friction as the inner and outer surfaces of the internal balls in the bearing face a differential in the distance they must roll. In addition, the systems based on this approach lack a precise mechanism for maintaining the strict alignment of the bearings as they roll in the concave track. Torque from the force of the stylus at the end of the tone arm moving across the record can induce slight deviations in the path of the bearings in the concave track, translating into tracking error and possible crabbing motions. Systems using bearings rolling on the outside of a convex surface (usually a glass tube or metal rod) require additional bearings, adding friction and weight.

This invention uses free-rolling precision balls positioned between precision rods or tubes to provide an extremely low lateral friction coefficient without need of and external air supply or servo mechanism, and with lower friction and greater precision than systems based on miniature roller bearings functioning as wheels rolling in semicircular grooves. Additional features include further reduction of friction by driving the rods and balls externally, to simulate the effect of balls rolling between two infinite parallel surfaces. Further reduction of friction is achieved by minimizing the effective loading on the bearings by supporting the carriage using magnetic or buoyant means.

BRIEF SUMMARY OF THE INVENTION

This invention employs free-rolling (un-caged) ball bearings positioned between moving and fixed parallel linear tracks of highly polished rods or tubes. The reduced weight of the moving carriage in comparison to the machined blocks in Mankovitz (3,006,652, 1961), coupled with the precise radius of the rods and sphericity of the rolling balls, permits very free rotation of the tone arm assembly (8-12) in the vertical axis, avoiding the need for an additional pivot bearing as used in Mankovitz. In Tomaselli, (2,948,538, 1960), rolling balls moving in parallel concave channels with diameter greater than the balls permit some free rotation in the vertical axis while preserving low linear friction in the direction of the stylus path, but the freedom of the balls to roll forward and backward orthogonally to the linear rolling motion allows tracking error as well as transient frequency errors if the stylus encounters greater resistance in the groove of the record medium, as in highly modulated musical passages, or in the case of serious record warping. By constraining the tone arm assembly from angular or translational deviation in the horizontal plane, this invention eliminates those sources of potentially audible distortion while reducing lateral friction below that attainable in the Mankovitz and Tomaselli mechanisms. More specifically, this invention lends itself to several alternate embodiments in which friction is further reduced by (a) applying supporting force through flotation means or magnetic means or (b) eliminating static friction by rotating the rods of the fixed track by means of a belt, gears or idler wheel, thereby keeping the free rolling balls, and the moving and fixed rods, in continuous motion. The combination of moving and fixed rods rotating in contact with the rolling balls simulates the motion of free rolling balls between two infinite surfaces moving in opposite directions.

In another alternate embodiment, two sets of moving and fixed tracks are positioned parallel to the desired path of the stylus, connected by gantry beams and the tone arm mounted via a vertically pivotable means to a connecting member between the gantry beams. In this embodiment the torsional forces generated by the stylus being laterally disposed from the track at the end of the tone arm are reduced and forces generated by the stylus tracking in the groove are more aligned parallel to the tracks, the closer the connecting member is to the radial path. In a further variation on this embodiment, the tone arm is mounted to a gantry crossbar via vertically pivotal means connecting the two sets of moving and fixed tracks, with the head-shell and stylus assembly mounted at 90 degrees to the orientation of the tone arm. While it is unconventional for the tone arm to pivot in the same vertical plane encompassing the radial stylus path, any distortion induced by rotation of the stylus in this plane when encountering warped records is simply a trade-off versus similar distortion caused when the stylus rotates in the orthogonal vertical plane in conventional stylus orientation.

DETAILED DESCRIPTION AND BEST MODES OF IMPLEMENTATION

This invention employs free rolling bearings as in Mankovitz, (3,006,652, 1961) and Tomaselli (2,948,538, 1960) but the balls roll between two parallel pairs of highly polished parallel rods or tubes. The reduced weight of the moving carriage, consisting mainly of the moving rods (5) and tone arm assembly (8-12), in comparison to the machined block in Mankovitz, coupled with the precise radius of the rods, permits very free rotation of the tone arm in the vertical axis, avoiding the need for an additional pivot bearing as used in Mankovitz. Although the Tomaselli device permits relatively free rotation in the vertical axis, it also allows translation of the tone arm and carriage assembly forward and backward along the tangent to the record groove in response to perturbation by record warps, stylus drag, or external stimulus. Further, while the Tomaselli mechanism, like this invention, does permit relatively free rotation of the tone arm assembly in the vertical plane, it also permits the tone arm and carriage assembly to rotate slightly in the horizontal plane, resulting in transient tracking error if the tone arm "crabs" its way across the record. In this invention, in contrast to Tomaselli, horizontal rotation is prevented, but the low lateral friction of Mankovitz and Tomaselli's mechanisms is preserved, and in the preferred embodiment, further reduced.

Figure 1:
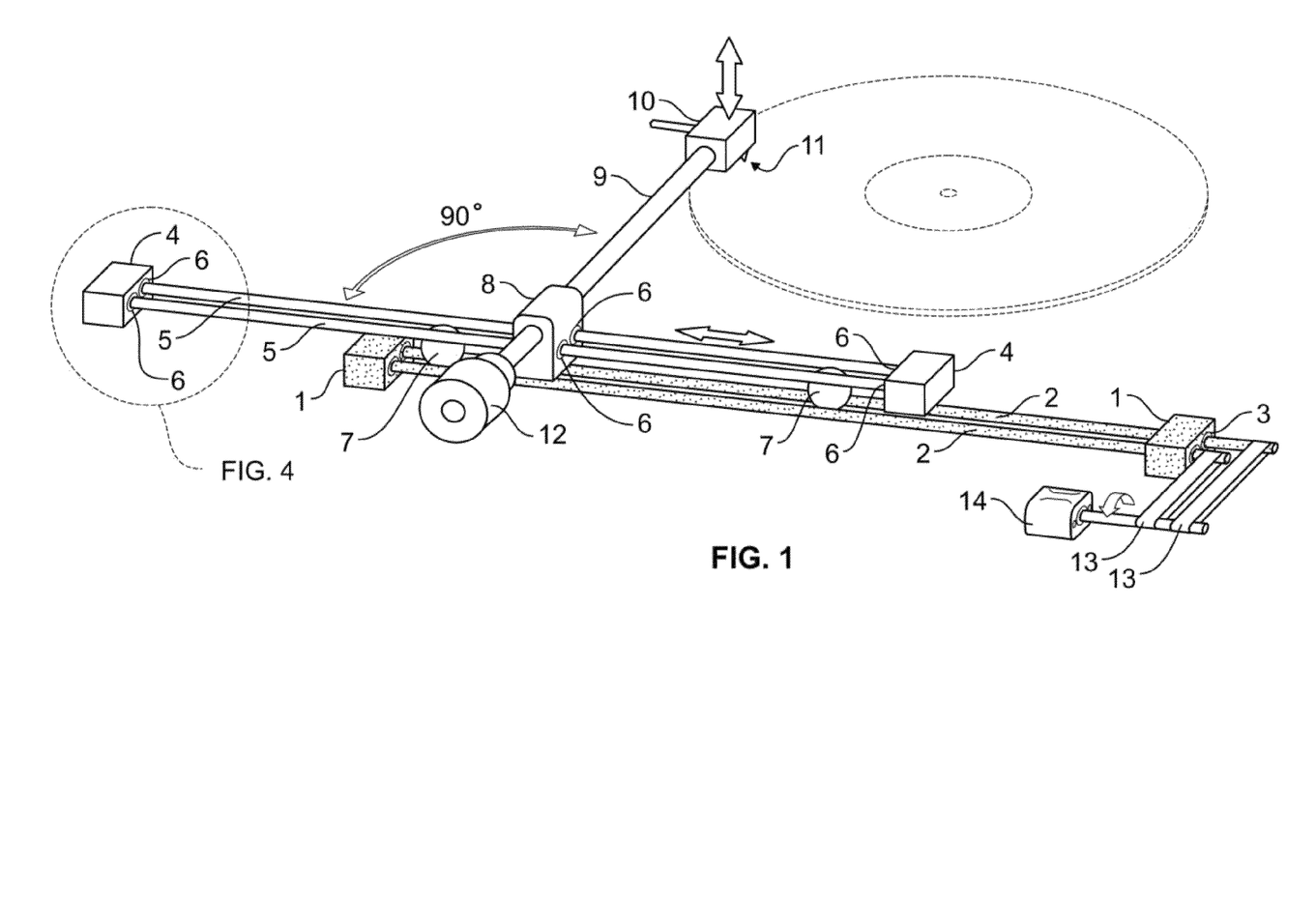
FIG. 1. Apparatus with single set of carriage and track rods, powered by a rotational motor, at beginning of record play.
Figure 2:
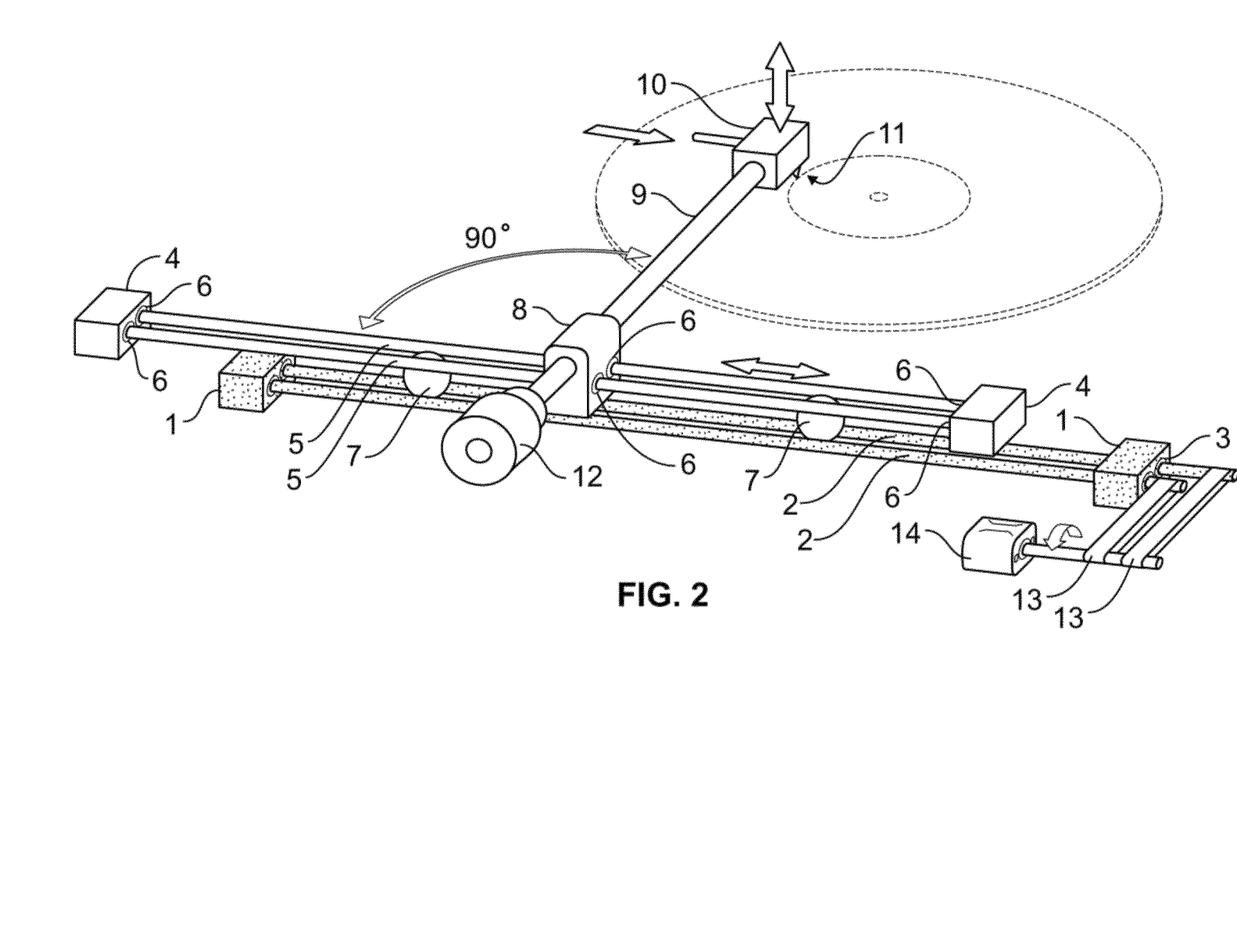
FIG. 2. Apparatus as in FIG. 1 at end of record play.
Figure 4:
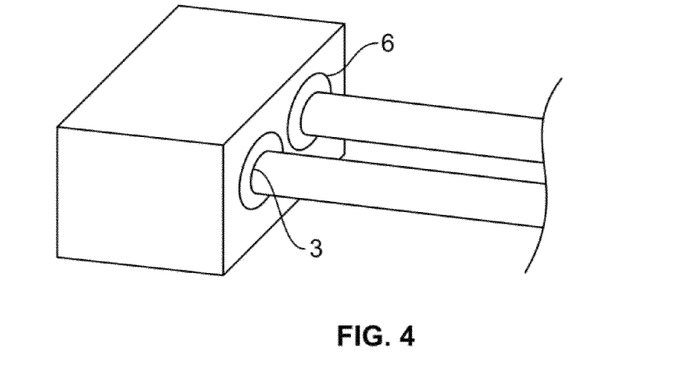
FIG. 4. Detail showing bearings in bearing block permitting rotation of rods around linear axis.

The invention permits several alternative embodiments, as follows:

FIG. 1 illustrates the apparatus using powered rotating parallel rods with the tone arm located at the outer groove of the record as when playback begins. The tone arm assembly with counterweight (8-12) is affixed to the moving carriage consisting of parallel rods (5) mounted in bearings (6) terminating in bearing blocks (4). The moving carriage assembly (4-6, 8-12) rests on precision ball bearings (7) which are guided by the fixed track assembly consisting of bearing blocks (1), fixed tracks (2) and bearings (3) with the fixed rods being synchronously driven by a rotational motor which may be electrical, hydraulic, spring-wound or gravity powered. This embodiment, with rotationally driven rods, eliminates static friction issues, in contrast to Tomaselli and Mankovitz, in which the coefficient of static friction in the lateral dimension, though small, may be sufficiently greater than the deflection resistance of the stylus, leading to a "crabbing" motion, where the stylus increasingly deflects until the deflection restoring force exceeds the coefficient of static friction, at which point the balls roll, and the arm moves and "catches up" with the stylus. Such action defeats the purpose of the linear tracking tone arm, because deflections at the stylus tip, while small in the linear dimension, may represent large angular deviations owing to the short length of the cantilever in which the stylus is mounted. This problem may also be present to some extent in competitive linear tracking arms that rely on sealed roller bearings (e.g. Souther, 4,346,467, 1982). FIG. 1 depicts an embodiment with rotating rods driven a belt drive mechanism consisting of belts (13) and a motor (14), but the drive mechanism may utilize gears, idler wheels, flexible tubes, or hydraulic impellers to impart rotation to the rods in the fixed track. FIG. 2 illustrates the same apparatus as in FIG. 1 with the tone arm located at the inner groove of the record as when playback ends. FIG. 4 shows the termination of the rods (2,5) in end blocks (1,4) containing low friction bearings (3,6) to permit rotation of the rods.

Figure 5:
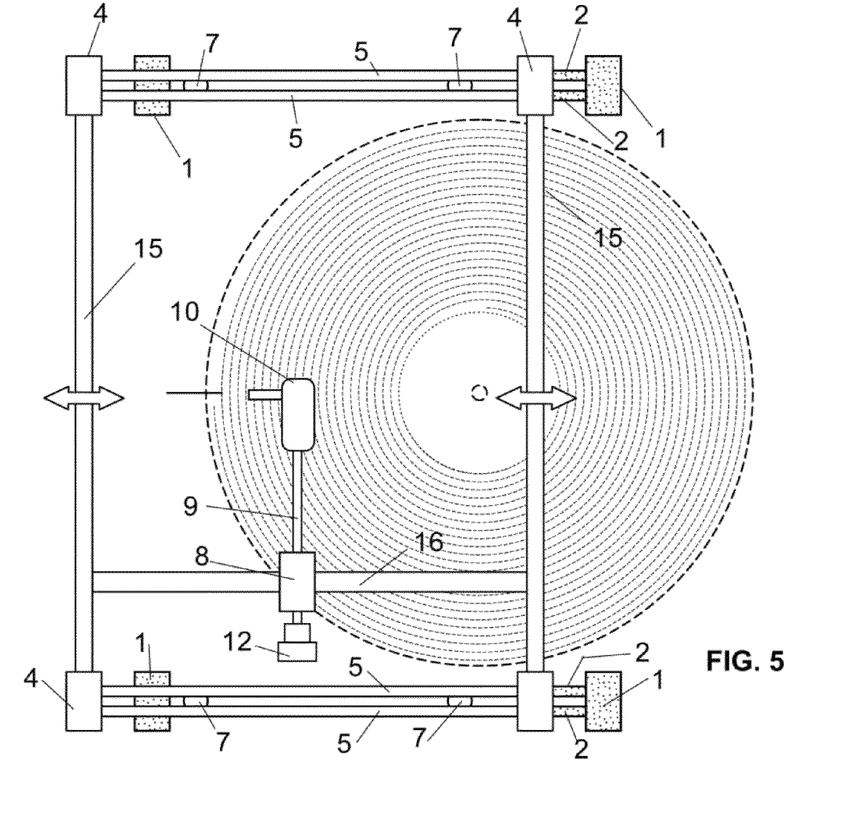
FIG. 5. Apparatus as in FIG. 1 but utilizing two sets of carriage and tracks to minimize torque on tone arm and carriage. Rotational source not shown.
Figure 8A:
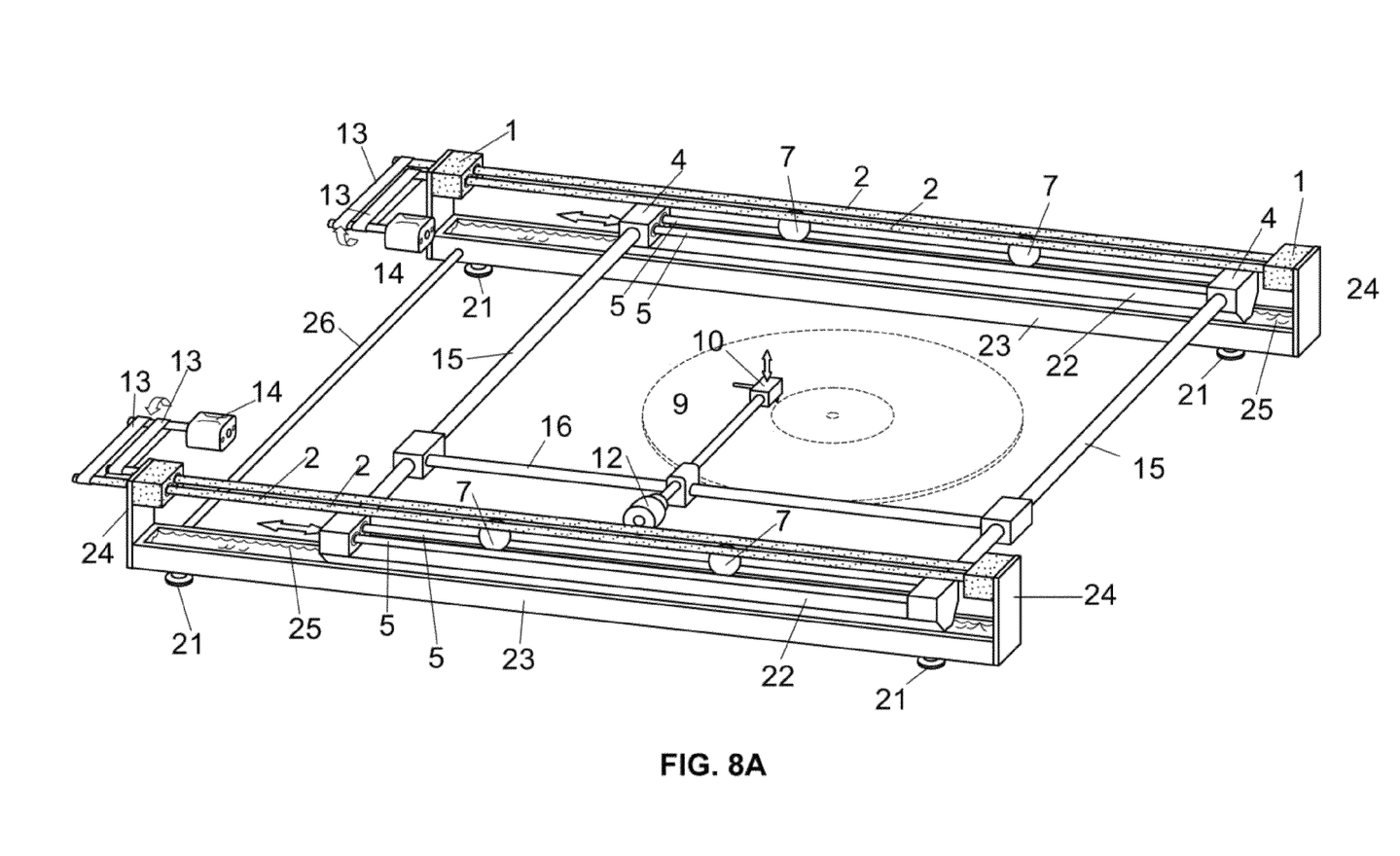
FIG. 8A. Apparatus of FIG. 5 with buoyant support of moving carnage to reduce bearing load while maintaining strict tracking accuracy.

FIGS. 5 and 8A show an alternate embodiment using two pairs of tracks, with the tone arm assembly (8-12) mounted to a crossbar (16) with a pivoting mechanism supported by gantry cross-members (15). In this embodiment the vertical rotation of the tone arm assembly occurs in a vertical plane orthogonal to the radial path of the stylus (11) in the LP groove.

Figure 6:
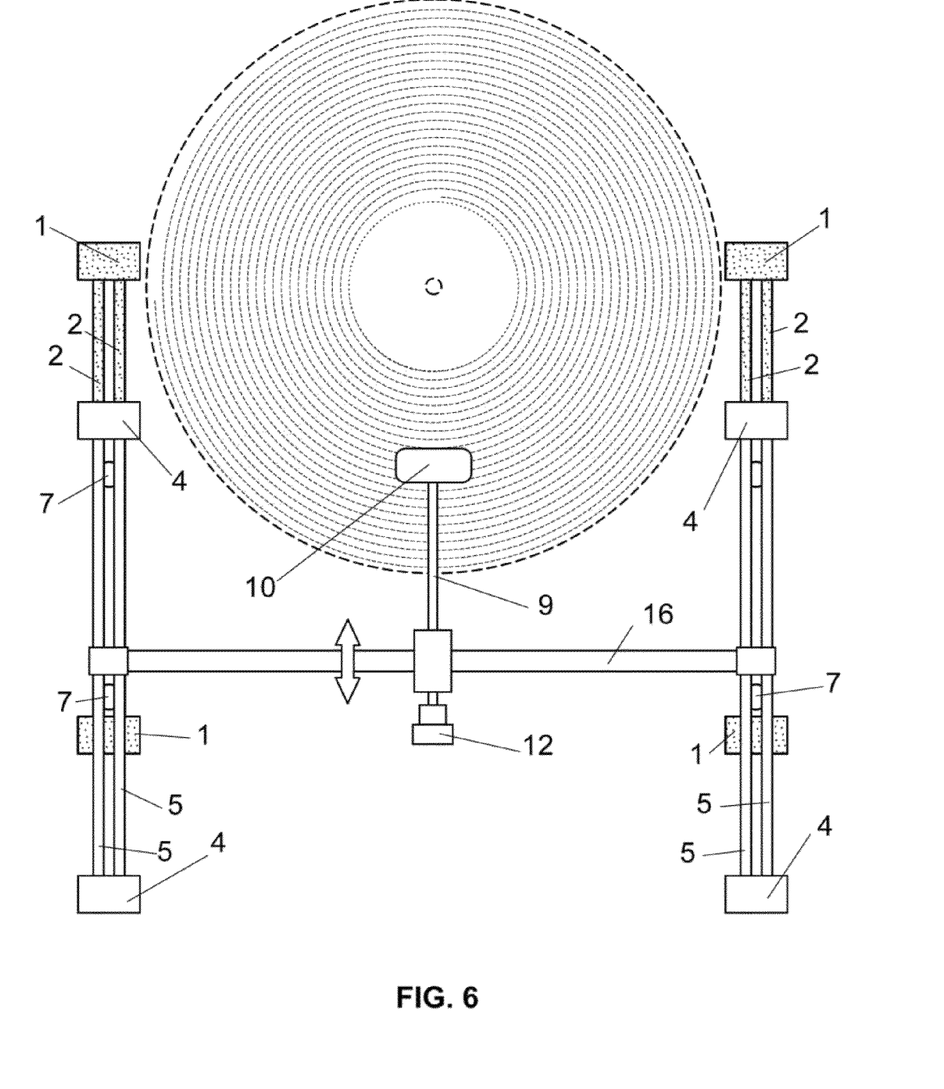
FIG. 6. Apparatus of FIG. 5 with tone arm pivoting in vertical plane parallel to radial path of stylus.
Figure 8B:
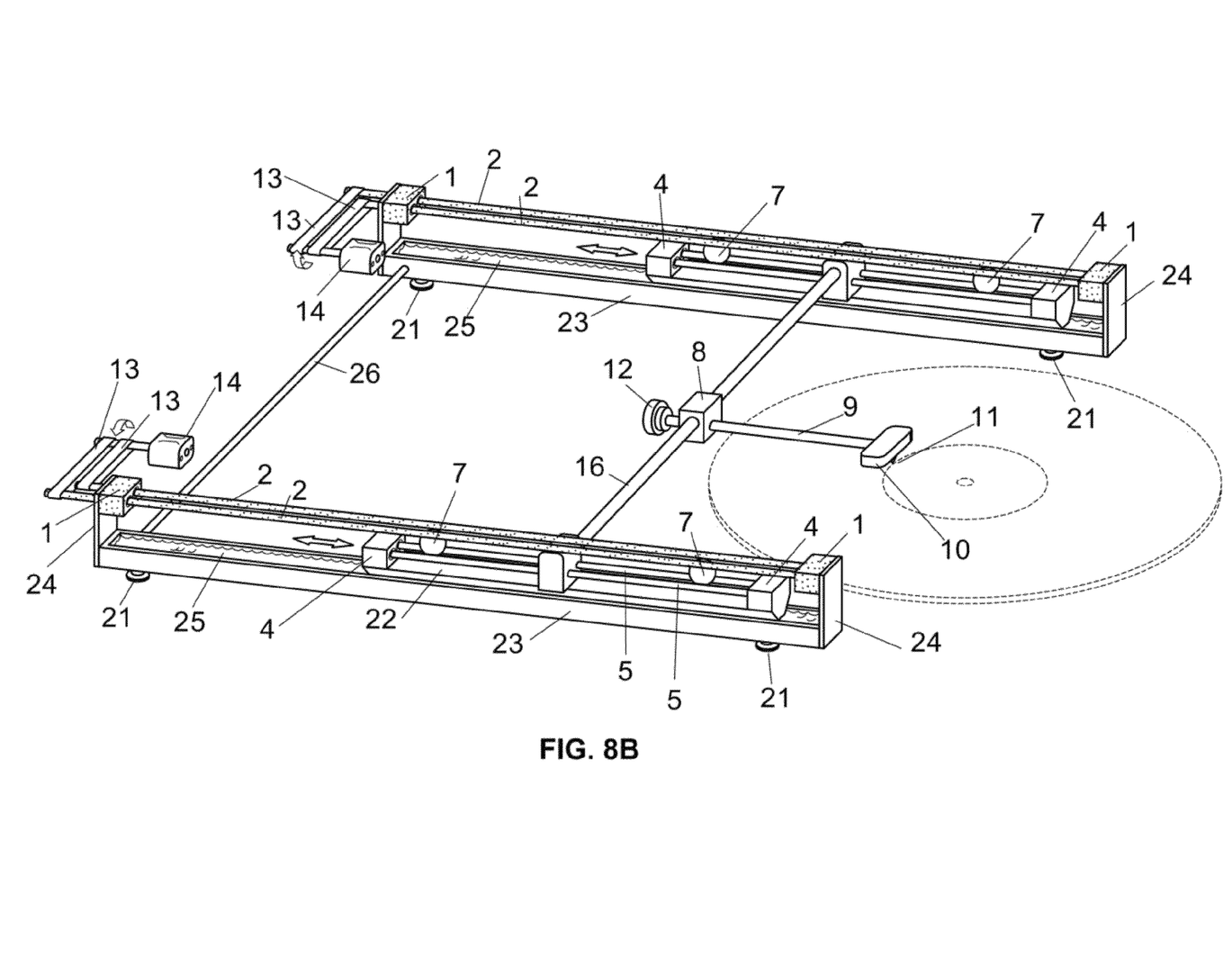
FIG. 8B. Apparatus of FIG. 6 with buoyant support of moving carriage to reduce bearing load while maintaining strict tracking accuracy.

FIGS. 6 and 8B show an embodiment using two pairs of tracks with a radially aligned tone arm in comparison to the transverse alignments of FIGS. 1-3, 5 and 8A.

Figure 3:
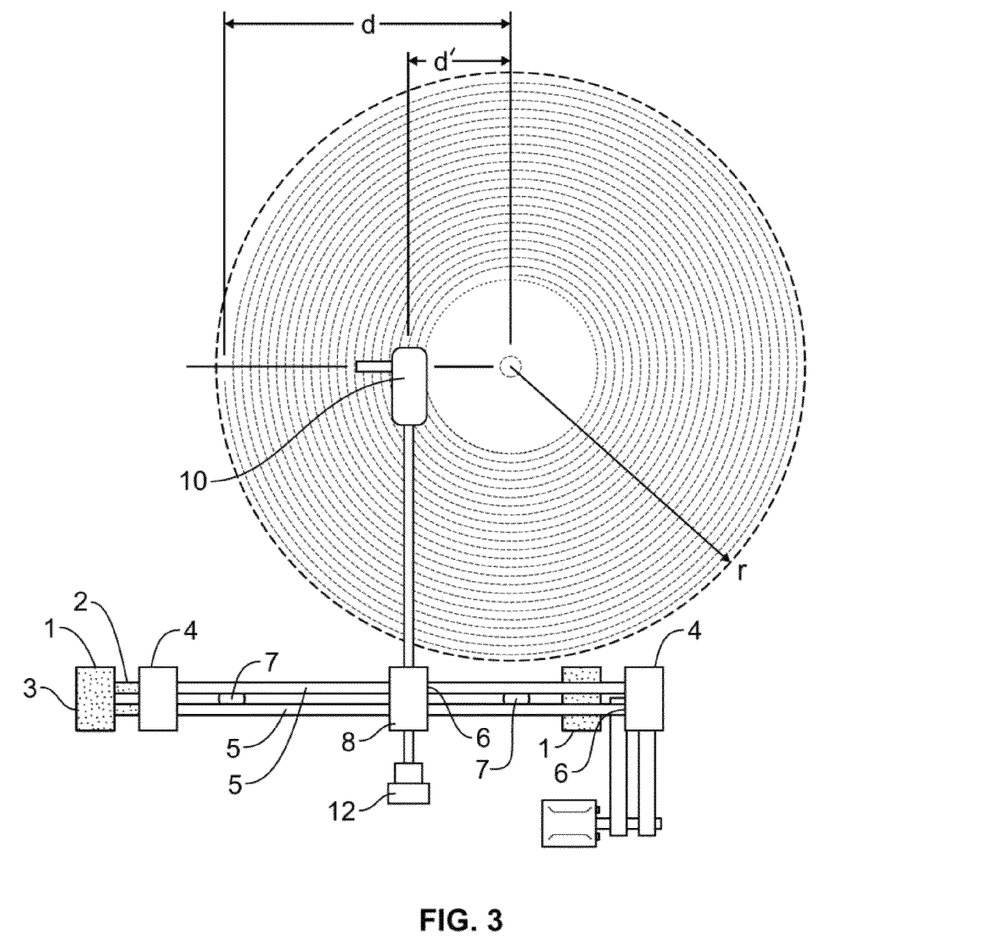
FIG. 3. Overhead view of FIG. 1.
Figure 7A:
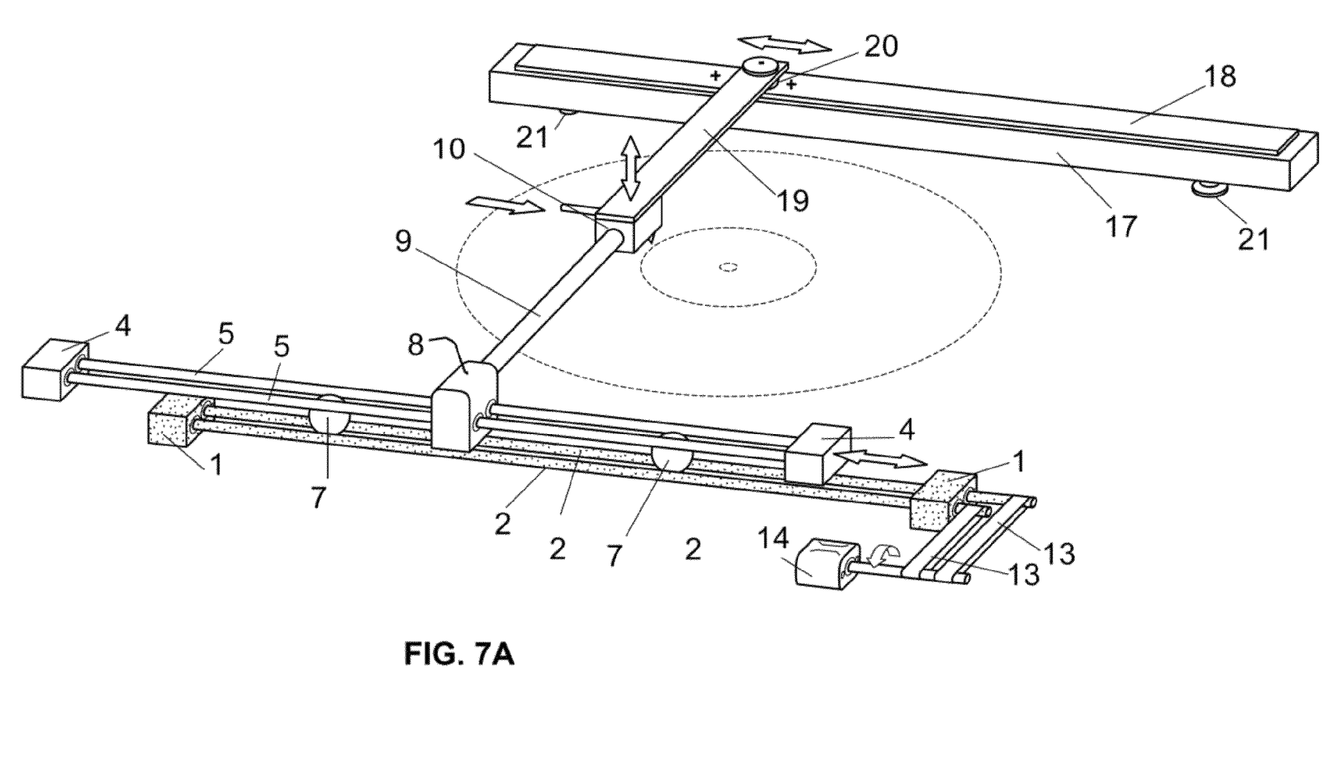
FIG. 7A. Apparatus of FIG. 1 with outboard magnetic support to control tracking force while eliminating counterweight.

FIG. 7A shows an alternate embodiment similar to FIGS. 1-3, adding (a) an extension (19) to the Tonearm, and (b) a magnetic track assembly comprising a base (17), a linear magnetic strip (18), height adjustment means to permit leveling (21) and a rare earth magnet (2) positioned with polarity to oppose the polarity of the strip (18) thereby supporting the tone arm, headshell and stylus and eliminating the counterweight (12—not shown) to reduce the overall moving mass of the system thereby making it more responsive to tracking force. The magnetic track assembly and opposing magnet can be replaced by a flotation-based system as described in FIG. 7C, but located parallel and opposite to the tracks, similarly to the positioning of the magnetic track assembly in FIG. 7A. In FIG. 7A, a rotational mechanism drives the fixed rods (2) in their bearings (3), imparting rolling motion to the balls (7) and the moving rods (5), thereby overcoming static friction that may result from the very slow lateral rolling moment of the balls in the absence of such rotational motion.

Figure 7B:
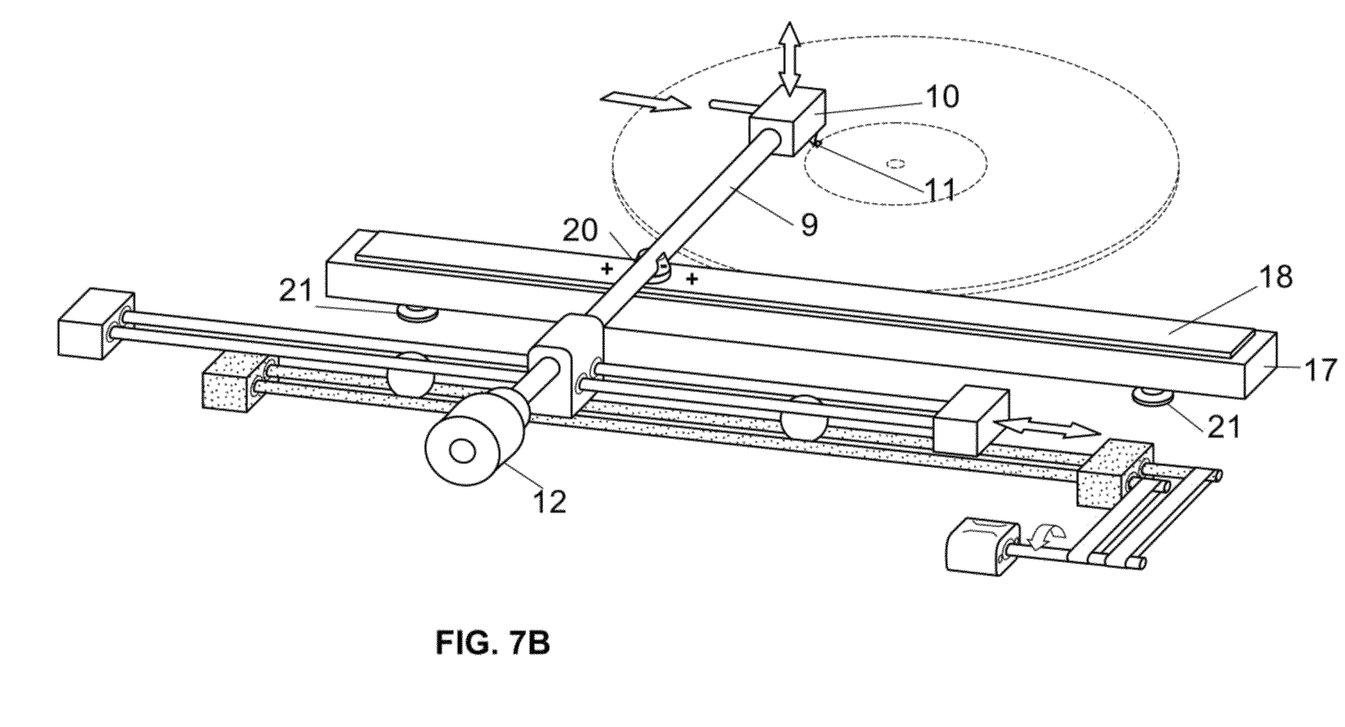
FIG. 7B Apparatus of FIG. 1 with inboard magnetic support to control tracking force while minimizing counterweight.

In FIG. 7B, the magnetic track assembly is positioned between the tracks and the LP, for a more compact arrangement, but retaining a counterweight (12) which can be less massive given the upward force from the magnetic assembly. As in the embodiment shown in FIG. 7A, in FIG. 7B the magnetic track assembly and opposing magnet can be replaced by a flotation based system as described in FIG. 7C, but located parallel and opposite to the tracks, similarly to the positioning of the magnetic track assembly in FIG. 7A.

Figure 7C:
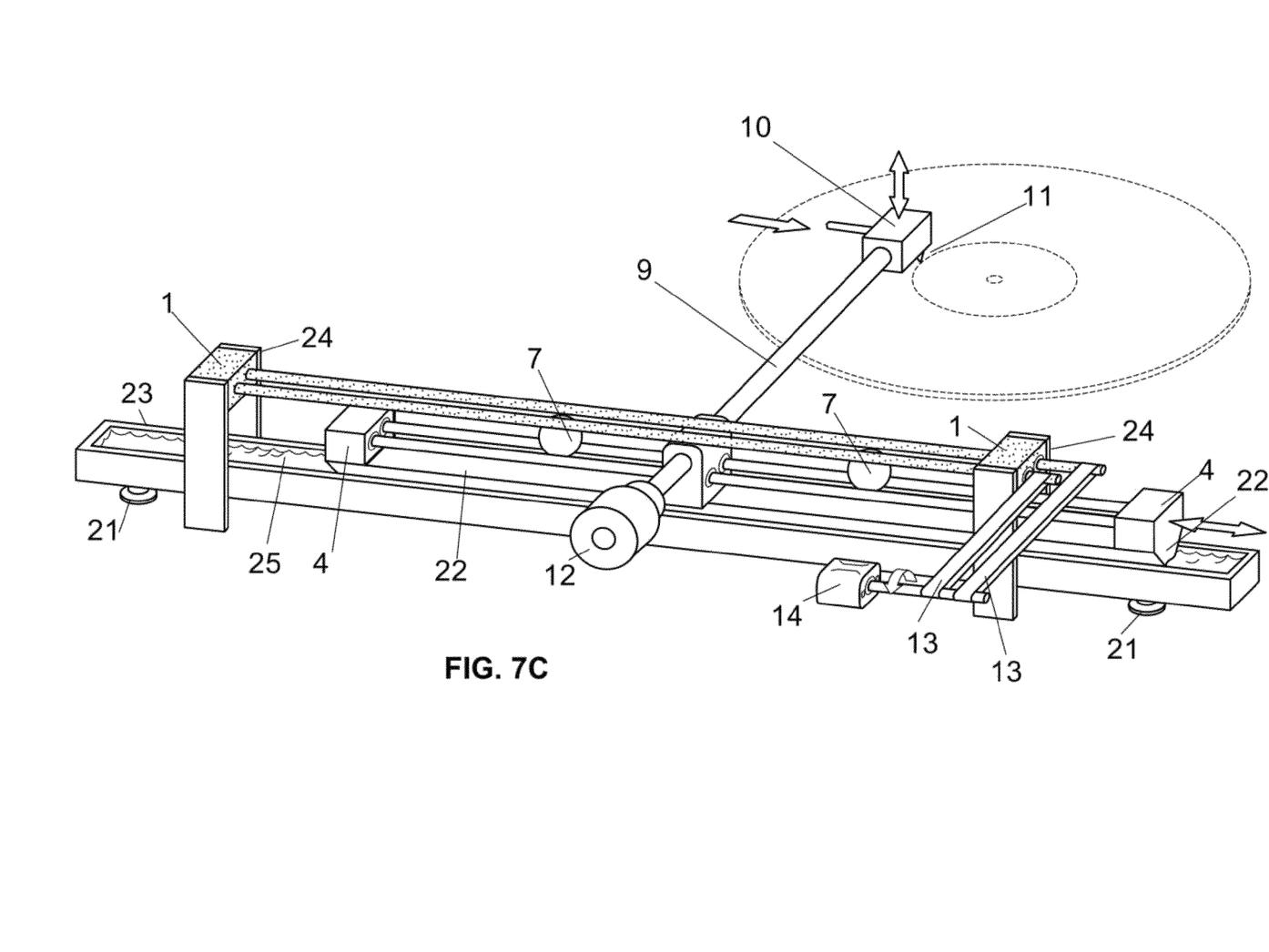
FIG. 7C. Apparatus of FIG. 1 with buoyant support of moving carriage to reduce bearing load while maintaining strict tracking accuracy.

In FIG. 7C, the tone arm and carriage assembly (4-6, 8-12) is positioned below the fixed track assembly (1-3) and supported by a float (22) in a basin (23) containing water or a viscous fluid. In this embodiment the fixed track assembly (1-3) is supported by stanchions or other means (24) which may include a mechanism to level the fixed track assembly (1-3). FIG. 7C depicts the rods (2) in the fixed track assembly driven by a rotational mechanism as in FIGS. 7A and 7B, to the same effect.

Figure 7D:
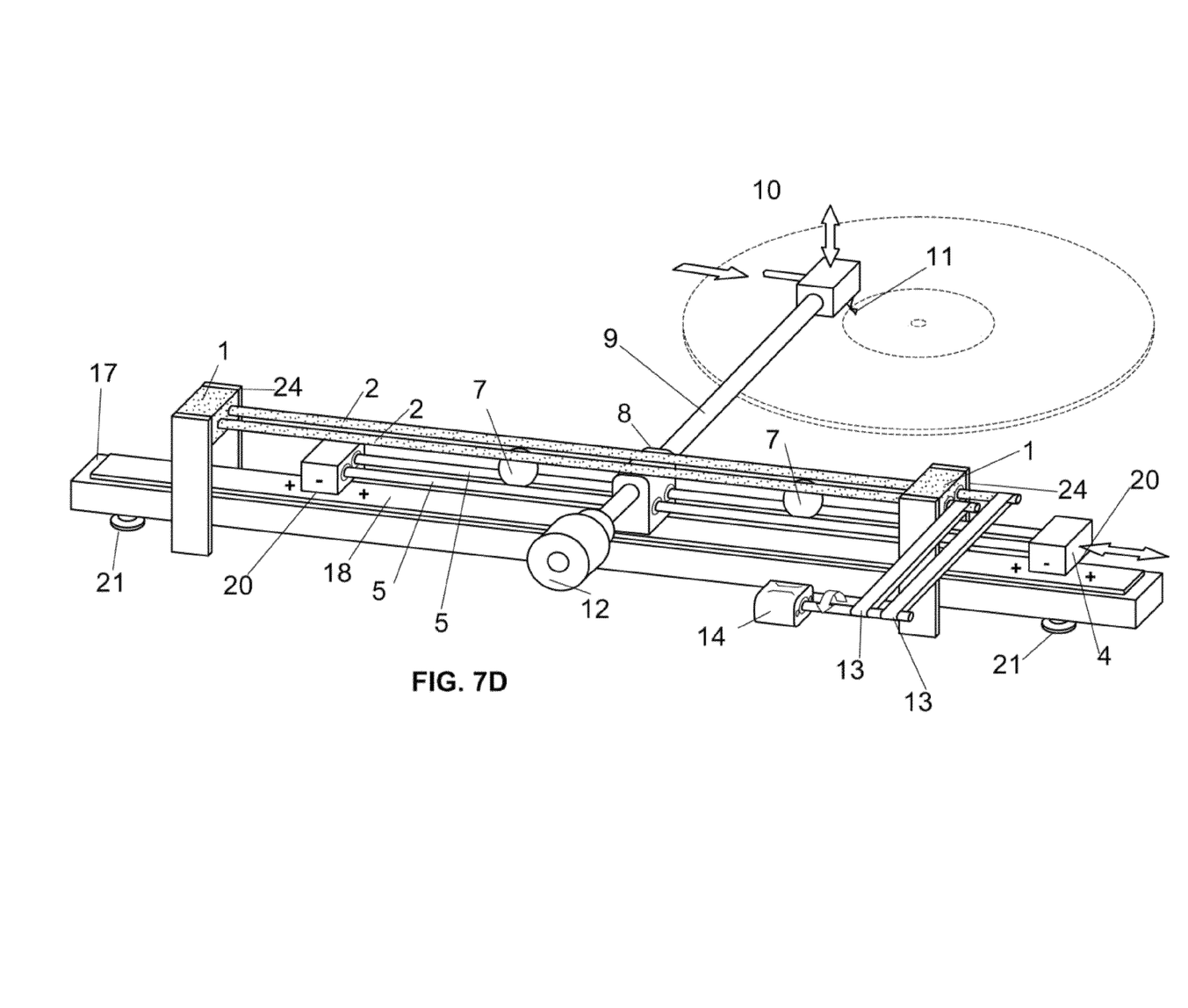
FIG. 7D. Apparatus of FIG. 1 with magnetic support of moving carriage to reduce bearing load while maintaining strict tracking accuracy.

FIG. 7D shows an embodiment comparable to that in FIG. 7C, but substituting a magnetic support assembly (17, 18, 20, 21) for the flotation assembly (21-25) to similar effect.

FIG. 8A depicts an embodiment configured as in FIG. 5, but in which flotation means (21-25) support the moving rod assemblies connected by gantry cross-members (15). In FIG. 8A, the fixed rods (2) are driven by rotational means (13-14) to the same effect as in preceding figures. In the embodiment of FIG. 8A, the flotation assembly (21-25) can be replaced by magnetic support assembly (17, 18, 20, 21).

FIG. 8B depicts an embodiment configured as in FIG. 6, but in which flotation means (21-25) support the moving rod assemblies connected by the Tonearm cross-member (16). In FIG. 8B, as in FIG. 8A, the fixed rods (2) are driven by rotational means (13-14) to the same effect as in preceding figures. In the embodiment of FIG. 8B, the flotation assembly (21-25) can be replaced by magnetic support assembly (17, 18, 20, 21).

I claim:

1. An apparatus for playing phonograph records comprising:
  a. one or more carriages comprising two or more parallel cylindrical rods or tubes, situated parallel to or collinear with the desired radial path of a stylus from the outermost to the innermost groove of a phonograph record, held in parallel position by one or more bearing blocks containing low friction bearings permitting said rods or tubes to rotate about a long axis,
  b. one or more fixed tracks consisting of two or more parallel cylindrical rods or tubes, situated parallel to or collinear with the desired radial path of the stylus from the outermost to the innermost groove of the phonograph record, held in parallel position by one or more bearing blocks containing low friction bearings permitting said rods or tubes to rotate about the long axis,
  c. two or more loose ball bearings for each set of carriage and fixed track which roll between the rails of said carriage and track,
  d. a tone arm assembly comprising a linear member, a phonograph cartridge transducer with the stylus, and a counterweight or other means of controlling the downward force of the stylus on the phonograph record, which assembly is affixed to the one or more carriage(s) to orient the stylus to trace a straight radial path from the outermost groove to the innermost groove of the phonograph, at all times maintaining a strictly tangent orientation of the phonograph cartridge and stylus to the groove of the phonograph record, said apparatus enabling translation of the tone arm assembly and the one or more carriage laterally with very low friction while maintaining perfect tangency of the stylus to the groove in a straight radial path across the record surface, while also permitting free rotation of the tone arm in the vertical plane by virtue of the rotational freedom of the rods in the one or more carriages, or permitting rotation of the tone arm in the vertical plane by one or more bearing blocks or hinges in the one or more carriages.

2. An apparatus as in claim #1, including one or more rotational sources, which are one or more electric motors, spring-wound mechanisms, a gravity powered apparatus, or a hydraulic mechanism, and which impart or imparts synchronous rotation to the rods or tubes in the one or more tracks by drive belts, idler wheels, gears, magnetic couplings or impellers.

3. An apparatus as in claim #1, in which downward normal force of gravity on the bearings is reduced by addition of a buoyant means floating fully or partially submerged in a liquid bath aligned parallel to the one or more carriages and one or more fixed tracks and in which the flotation effect is regulated by varying the flotation of the buoyant means with the upward normal force of the buoyant means largely offsetting the downward normal force of gravity of the one or more carriages and tone arm assembly, leaving only sufficient net downward normal force to maintain contact with the ball bearings to serve as guides for the mechanism.

4. An apparatus as in claim #1, in which the downward normal force of gravity on the bearings is reduced by addition of one or more magnetic strips mounted parallel to the one or more carriages and one or more fixed tracks, with one or more opposing magnets positioned on the tone arm assembly or the one or more carriages in which reduction of the downward normal force of gravity is regulated by varying the separation of the one or more magnetic strips and the one or more opposing magnets so as to largely offset the downward normal force of gravity on the bearings, leaving only sufficient downward normal force to maintain contact with the bearings to serve as guides for the one or more carriages and the tone arm assembly.

5. An apparatus as in claim #1, in which the tone arm assembly and the one or more carriages are mounted below the one or more fixed tracks and supported by addition of a buoyant means submerged in one or more liquid baths aligned with the one or more fixed tracks and in which the supporting upward normal force of the buoyant means is regulated by varying the buoyant so as to slightly offset the weight of the one or more carriages and tone arm assembly, thereby creating minimally sufficient upward normal force to maintain contact with the ball bearings to serve as guides for the one or more carriages and tone arm assembly.

6. An apparatus as in claim #1, in which the tone arm assembly and the one or more carriages are mounted below the fixed tracks and supported by addition of one or more parallel magnetic strips below the one or more carriages, with one or more opposing magnets positioned on the one or more carriages to offset by a slight margin the downward normal force of gravity of the one or more carriages and tone arm assembly, leaving only minimally sufficient net upward normal force to maintain contact with the ball bearings to serve as guides for the one or more carriages and tone arm assembly.

\* \* \* \* \*